United States Patent
Gebauer et al.

(10) Patent No.: US 7,494,257 B2
(45) Date of Patent: Feb. 24, 2009

(54) LIGHTING MECHANISM

(75) Inventors: Matthias Gebauer, Reutlingen (DE); Steffen Wiersdorff, Reutlingen (DE)

(73) Assignee: Automotive Lighting Reutlingen GmbH (DE)

( * ) Notice: Subject to any disclaimer, the term of this patent is extended or adjusted under 35 U.S.C. 154(b) by 46 days.

(21) Appl. No.: 11/601,522

(22) Filed: Nov. 16, 2006

(65) Prior Publication Data

US 2007/0147059 A1    Jun. 28, 2007

(30) Foreign Application Priority Data

Dec. 15, 2005   (DE) ........................ 10 2005 059 958

(51) Int. Cl.
*F21V 9/00* (2006.01)
(52) U.S. Cl. .................. 362/511; 362/626; 362/606; 362/459; 362/475; 362/487; 362/509; 362/512
(58) Field of Classification Search .................. 362/511, 362/626, 520, 516, 459, 460, 475, 487, 509, 362/512, 606
See application file for complete search history.

(56) References Cited

U.S. PATENT DOCUMENTS 5,890,796 A * 4/1999 Marinelli et al. ............ 362/307

2002/0071267 A1 * 6/2002 Lekson et al. ................. 362/31

FOREIGN PATENT DOCUMENTS

DE             10328216 A1    1/2005

* cited by examiner

*Primary Examiner*—Stephan F Husar
*Assistant Examiner*—Jessica L McMillan
(74) *Attorney, Agent, or Firm*—Central Coast Patent Agency, Inc.

(57) ABSTRACT

The invention relates to an illumination device, particularly for automobiles, with a light source and a light conductor that emits the light from the light source conducted within it via a light decoupling surface, whereby light decoupling elements are positioned on the side opposite the light decoupling surface that divert light toward the light decoupling surface, whereby the light decoupling elements possess at least two diverting surfaces, and the first diverting surface is positioned closer to the light source than the second diverting surface of a light decoupling element, each of which subtends an angle with the light decoupling surface whereby the angles of the diverting surfaces are so selected that at least a portion of the light striking the second diverting surface is transmittable through it under refraction, and may be again coupled into the light conductor by means of the first diverting surface of the subsequent decoupling element, whereby this light is at least partially conducted from the first onto the second diverting surface of an decoupling element, and may be decoupled toward the decoupling surface by means of the second diverting surface.

8 Claims, 2 Drawing Sheets

LIGHTING MECHANISM

CROSS-REFERENCE TO RELATED DOCUMENTS

Figure 1:
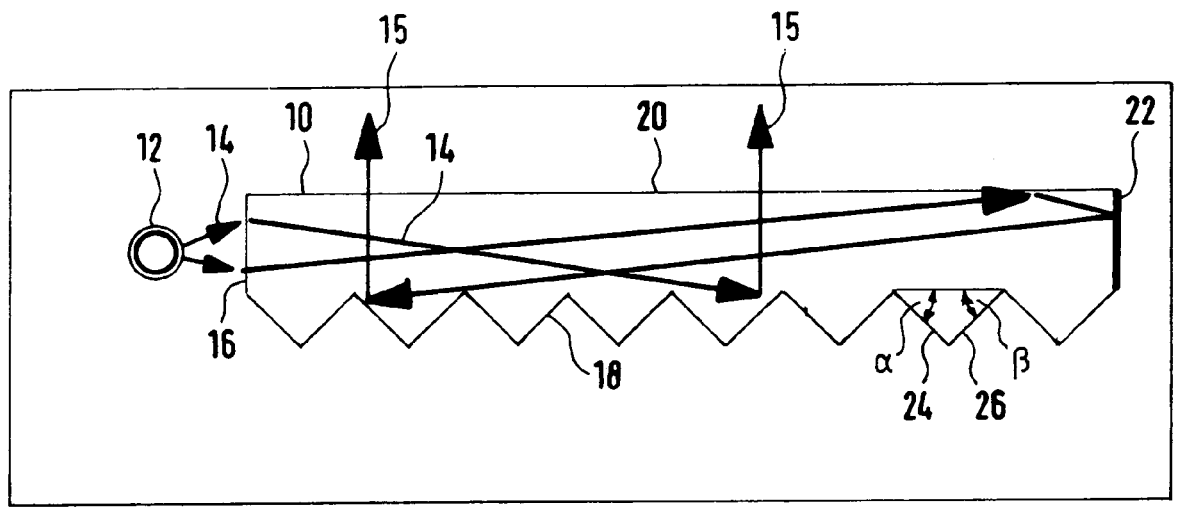

The present application claims priority to a German patent application serial number 10 2005 059 958.3 entitled "Lighting Mechanism", which was filed on Dec. 15, 2005, which is incorporated herein in its entirety, at least by reference.

DESCRIPTION

The invention relates to an illumination device, particularly for automobiles, with a light source and a light conductor that emits the light from the light source conducted within it via a light decoupling surface, whereby light decoupling elements are positioned on the side opposite the light decoupling surface that divert light toward the light decoupling surface, whereby the light decoupling elements possess at least two diverting surfaces, and the first diverting surface is positioned closer to the light source than the second diverting surface of a light decoupling element, each of which subtend an angle with the light decoupling surface.

Such light conductors are well known as the state of the art, and are used as components of automotive headlights.

For example, an illumination device for automobiles, particularly a signal lamp, is known from DE 103 28 216 A1 with illumination means and at least one spar-shaped light conductor positioned with one light coupling surface in the illumination area. For this, the outer circumference of the light conductor possesses several optical decoupling elements offset from one another. The light within the light conductor striking these optical decoupling elements is reflected such that it exits onto the one circumferential area of the light conductor opposite the pertinent decoupling element. Intermediate areas with no decoupling are provided between the decoupling elements. Thus, the length of the intermediate areas and the length of the decoupling areas may vary over the length of the light-conductor. In this manner, the goal of enabling deviated brightness distribution of the quantity of the light already present in the light conductor along the extension direction of the light conductor should be achieved. The light conductor should then possess a uniform appearance image. For this, the light conductor is generally based on the principle of total reflection within the light conductor until the light strikes a decoupling element and is then so diverted that it strikes the wall of the light conductor at such an angle that it may be decoupled out of it. If the light does not strike a decoupling element, then the light cannot leave the light conductor, and is conducted to the end of the light conductor. This light is then reflected by the end of the light conductor, and strikes an additional diverting face of the decoupling element and is decoupled from the light conductor in the conventional manner.

It is the task using a conventional illumination device to achieve light decoupling with the least possible loss, whereby particularly light irradiation within an angle of less than 90°, or toward the light source may be achieved.

The invention solves this task by means of a conventional illumination device in which the angle of the diversion faces to the light decoupling surface or optical axis of the light conductor is so selected that at least a portion of the light striking the second diverting face is transmittable by it with refraction, and may again be re-coupled into the light conductor by means of the first diverting surface of the subsequent decoupling element, whereby this light is at least partially conducted from the first to the second diverting surface of an decoupling element, and may be diverted by means of the second diverting surface toward the light decoupling surface and may be decoupled by it.

Such a configuration has the advantage that, along with the direct decoupling described by the state of the art, a more indirect coupling may be applied for optimum output of the light coupled into the light conductor. For this, the light exits the light conductor at a light-decoupling unit toward a direction opposite the light-decoupling surface. Upon exit, the light is refracted such that it is re-coupled into the subsequent decoupling element, and is only then totally reflected from the second diverting surface of the decoupling element. This offers the advantage that a corresponding configuration of the light conductor improves light distribution that may be more individually adjusted by configuring and optimizing the two angles of the diverting surfaces to the decoupling surface or to a longitudinal axis of the light conductor that both the direct and the indirect beams are decoupled. Both light beams then jointly create the light distribution. This particularly offers the advantage that the direct beam frequently exits the light at another angle to the light decoupling surface or optical longitudinal axis of the light conductor than does the indirect decoupled light beam. Moreover, optimization of the decoupling elements improves the efficiency of the light conductor both for the direct and for the indirect decoupling.

Moreover, it may be useful depending on the arrangement of the light conductor to decouple light from the indirect arrangement, since many problems exist for direct light decoupling, especially for complicated light conductor arrangements. This cannot be realized by means of direct decoupling, especially when the light conductor is so shaped that the light must first be reflected back toward the light source by means of the decoupling, since the light beams do not strike the decoupling element in such manner that they strike it in opposing direction, i.e., in the direction from which they strike the coupling element. The indirect coupling that may be achieved by means of proper configuration of the two angles with respect to each other, still allows the light in such cases to be decoupled from the light conductor. Proper arrangement of the diverting surfaces causes the light beam to strike indirectly on the second diverting surface of an decoupling element so that the beams then may be decoupled from the light conductor under total reflection.

The light beam therefore next strikes the first diverting surface for indirect decoupling in order to be passed from it to the second diverting surface.

For this, it may be provided that the light radiated from the light conductor be decoupled at an angle to the horizontal of less than or equal to 90°.

Alternatively or additionally, the light may also be decoupled at an angle greater than or equal to 90°. For an angle of less than 90°, it is assumed that the light is reflected back again in the direction toward the light source, or in the direction of the beam before it was diverted by means of the diverting surface. To the extent that direct and indirect decoupling is linked together, it may particularly be provided that the direct decoupling illuminates the one angular area, and the indirect coupling illuminates the other angular area. Particularly uniform and appropriate illumination is thus achieved by means of the various decoupling elements positioned in sequence.

For this, it may particularly be provided that the angle $\alpha$ formed between the first diverting surface and the decoupling surface is greater than the angle $\beta$ formed between the second diverting surface and the decoupling surface. In particular, the angle $\alpha$ $40°<\alpha<80°$, and $\beta$ $40°<\beta<60°$, and particularly the angle $\alpha$ $45°<\alpha 70°$, and $\beta$ $45°<\beta<55°$, and particularly the angle β 48°<β<52°. Further, it may be provided that the light conductor is spar-shaped and the light-decoupling surface extends along the longitudinal direction, whereby the light-coupling surface is a face of the spar-shaped light conductor.

The light-decoupling units may generally be separated from one another, or directly adjacent. It may also be provided that the dimensions of the light decoupling units vary across the light conductor.

Moreover, the distances between the individual decoupling elements may be varied across the light conductor.

The light conductor may, however, be flat, and may particularly be formed by the cover lens of an automobile headlight enclosing the exit surface of the headlight. For this, the cover lens must be of a light-refracting material.

In general, the light conductor consists of a light-refracting material, particularly a plastic material.

Moreover, it may be provided that prisms, cylinders, hemispheres, or free-form shapes are provided as light-decoupling units.

Finally, it may be provided that the illumination device is a component of an automobile headlight.

It may be also provided that the light conductors are so built into an automobile headlight that they possess a clear sweep inward or outward. For this, light emission from the light conductor may be necessary toward the light source, particularly for backswept light conductors.

Figures 2A, 2B:
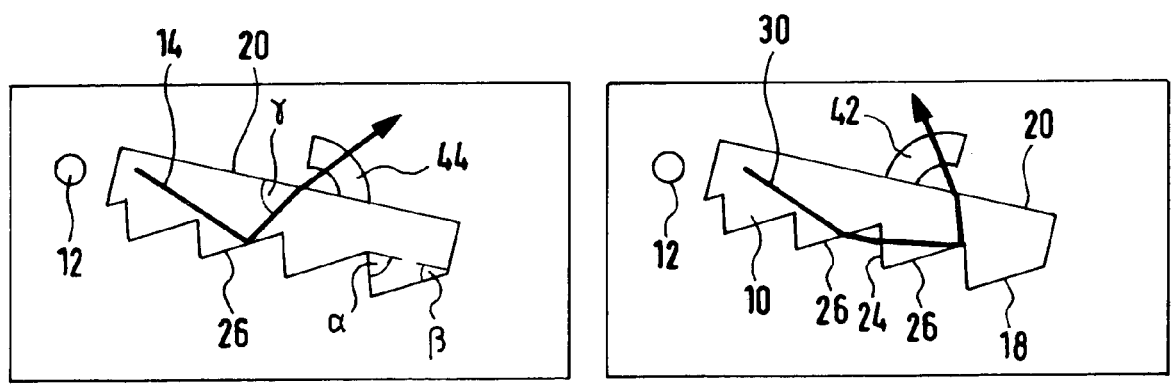
Figure 3:
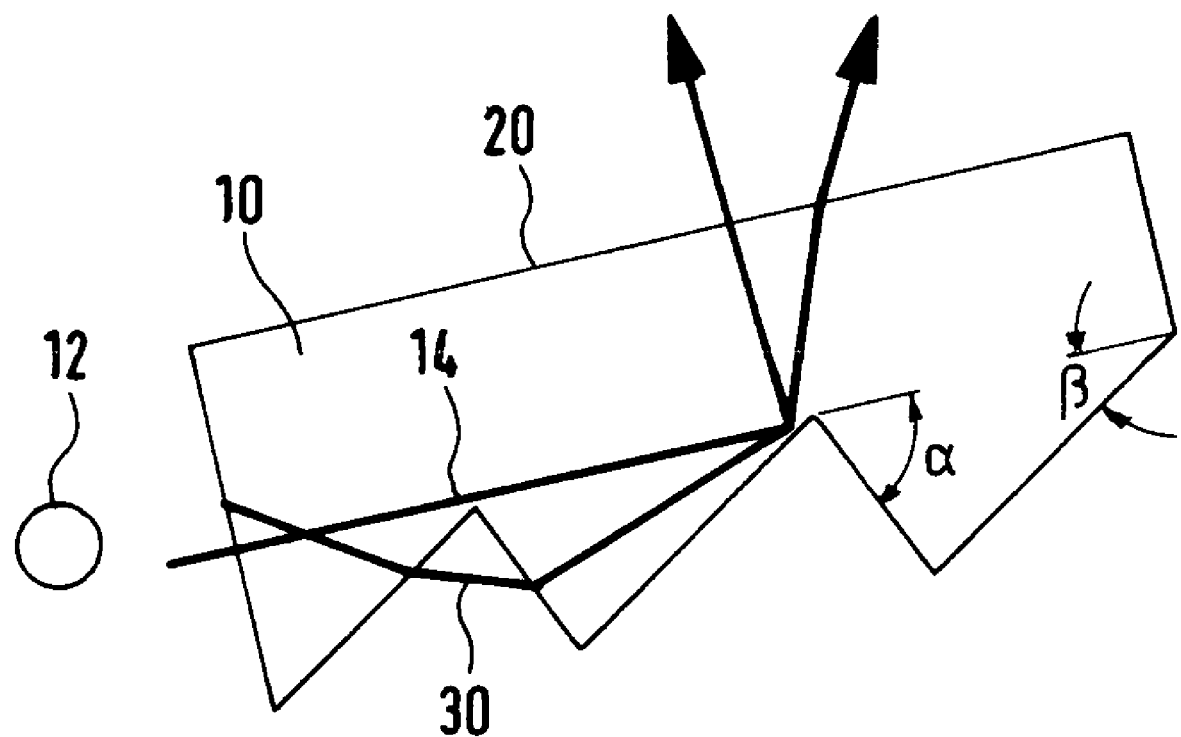

In the following, the invention will be described in greater detail using Figures, which show:

FIG. 1 a light conductor per the state of the art;

FIG. 2 schematic view of direct and indirect decoupling of an automobile headlight in a light conductor swept to the left in the drawing plane;

FIG. 3 the direct and indirect decoupling in a light conductor that is directed differently than the light conductor in FIG. 2.

FIG. 1 shows a light conductor that is overall designated by the reference index 10, and may, for example, be built into an automotive headlight. A light source 12 is also provided that introduces light into the light conductor 10 via a light coupling surface 16 positioned on a face of the spar-shaped light conductor 10. The light beams 14 are routed along the light conductor by means of total reflection until they strike a light-decoupling unit 18, here shown as a prism. For this, a large number of prisms are positioned in a strip-shaped section of the spar-shaped light conductor 10 extending longitudinally. Because of total reflection, the light is diverted by means of the decoupling elements 18 toward a light decoupling surface 20 opposite from the decoupling elements 18. As a beam 15, the light then exits the light conductor and serves to illuminate the area in front of an automobile, for example. The light passing through the light conductor that does not strike a light decoupling unit 18 is reflected from the end of the light conductor via a corresponding element 22 and returned back through the light conductor until it strikes a light decoupling unit 18 and is decoupled from the light conductor via the light decoupling unit 20.

The light decoupling units 18 here possess two diverting surfaces 24 and 26, whereby the diverting surface 24 faces the light source 12 forming the first diverting surface, and the face 26 forms the second diverting surface of the decoupling element 18 that is located farther from the light source. In the case of a prismatic decoupling element 18, the two diverting surfaces intersect with each other and form an angle. In the current case of FIG. 1, a balanced arrangement is involved. Moreover, both faces 24 and 26 form an angle α or β with the plane parallel to the surface 20.

The angles α and β are identical, as in the state of the art.

FIG. 2 shows a configuration in which the angles α and β are not identical. Particularly, the angle α is considerably larger than the angle β. The acute angle of the light decoupling units may thus be less than 90°. This ensures that an incident light beam 14 (FIG. 2a) strikes the second diverting surface 26 and leaves it not perpendicular to the surface of the light decoupling surface 20, but rather at an angle γ to it. Because of the angle γ, the light beam 14 is again refracted at the surface of the light-decoupling surface 20. The light beam overall exits the light conductor 10 at an angular area of equal to or greater than 90° to the surface of the light decoupling surface 20. FIG. 2b shows an indirect decoupling in which a light beam 30 does not exit the light conductor 10 in the direction of the light decoupling surface 20, but rather exits the light conductor 10 in the area of a second diverting surface 26 in the opposite direction, and because of refraction it experiences at the interface between the light conductor 10 in the area of the second diverting surface and the exterior medium, it is so refracted that it is again coupled into the light conductor in the area of the first diverting surface 24 of the subsequent decoupling element 18, and is refracted there and strikes the second diverting surface 26 of the pertinent decoupling element and is so diverted by it that the beam exits the light conductor 10 toward the decoupling surface 20, whereby the beam again experiences refraction at the interface between the light conductor 10 and the exterior medium. The light beam is thus radiated in an angular area of less than or equal to 90°, as is symbolized by the indicated angle 42.

FIG. 2a shows the angular area in the same manner, labeled with index 24.

Depending on whether the light beam exits the light conductor 10 under direct or indirect decoupling, various areas may be illuminated in this manner.

In FIG. 2b, which shows indirect decoupling, the light beam 30 strikes the second diverting surface at a considerably flatter angle. The beam is then diverted toward the second light-diversion surface, at which it is then diverted toward the light-decoupling surface, as the light beam 14 in FIG. 2a that strikes the light diversion surface 26 on its direct path. This fact results in various light irradiation angles.

FIG. 3 shows a configuration in which the light conductor 10 is swept in the other direction from FIG. 2. The direct and indirect decouplings are thus shown in one Figure.

The light beam decoupled in direct decoupling is again designated with the index 14, and the light beam decoupled in indirect decoupling is again designated with the index 30, as in FIG. 2b. Because of the different sweep of the light conductor 10 between FIG. 2 and FIG. 3, the direct light beam 14 is again decoupled toward the light source, whereby the light beam 30 that exits from the light decoupling surface 20 via the indirect decoupling is decoupled again in the direction away from the light source, shown here in the drawing plane to the left. In this manner, even complicated installation positions and location may be provided with the most uniform illumination possible.

The invention claimed is:

1. Illumination device, particularly for automobiles, with a light source (12) and a light conductor (10) that emits the light from the light source (12) conducted within it via a light decoupling surface (20), whereby light decoupling elements (18) are positioned on the side opposite the light decoupling surface (20) that divert light toward the light decoupling surface (20), whereby the light decoupling elements (18) possess at least two diverting surfaces (24, 26), and the first diverting surface (24) is positioned closer to the light source (12) than the second diverting surface (26) of a light decoupling element (18), each of which subtends an angle (α, β)

with the light decoupling surface (20) characterized in that the angles (α, β) of the diverting surfaces (24, 26) are so selected that at least a portion of the light striking the second diverting surface (26) is transmittable through it under refraction, and may be again coupled into the light conductor (10) by means of the first diverting surface (24) of the subsequent decoupling element (18), whereby this light is at least partially conducted from the first diverting surface (24) onto the second diverting surface (26) of an decoupling element, and may be decoupled toward the decoupling surface (20) by means of the second diverting surface (26).

2. Illumination device as in claim 1, characterized in that light radiated from the light conductor (10) may be decoupled at an angle to the decoupling surface (20) at less than or equal to 90°.

3. Illumination device as in claim 1, characterized in that light radiated from the light conductor (10) may be decoupled at an angle to the decoupling surface (20) at greater than or equal to 90°.

4. Illumination device as in claim 1, characterized in that the light conductor (10) is spar-shaped, and the light decoupling surface (20) extends longitudinally, whereby the light decoupling surface (16) is a face of the spar-shaped light conductor (10).

5. Illumination device as in claim 1, characterized in that the light conductor (10) is shaped as a flat body.

6. Illumination device as claim 1, characterized in that the light conductor (10) consists of a light-conducting and light-refracting material.

7. Illumination device as in claim 1, characterized in that the light decoupling units (18) are prisms, cylinders, or hemispheres, or are free shapes.

8. Illumination device as in claim 1, characterized in that it is a component of an automobile headlight.

* * * * *